Dec. 19, 1939.  W. E. HARRINGTON  2,184,042
HYDRAULIC BRAKE SYSTEM
Filed Aug. 14, 1937  2 Sheets—Sheet 1
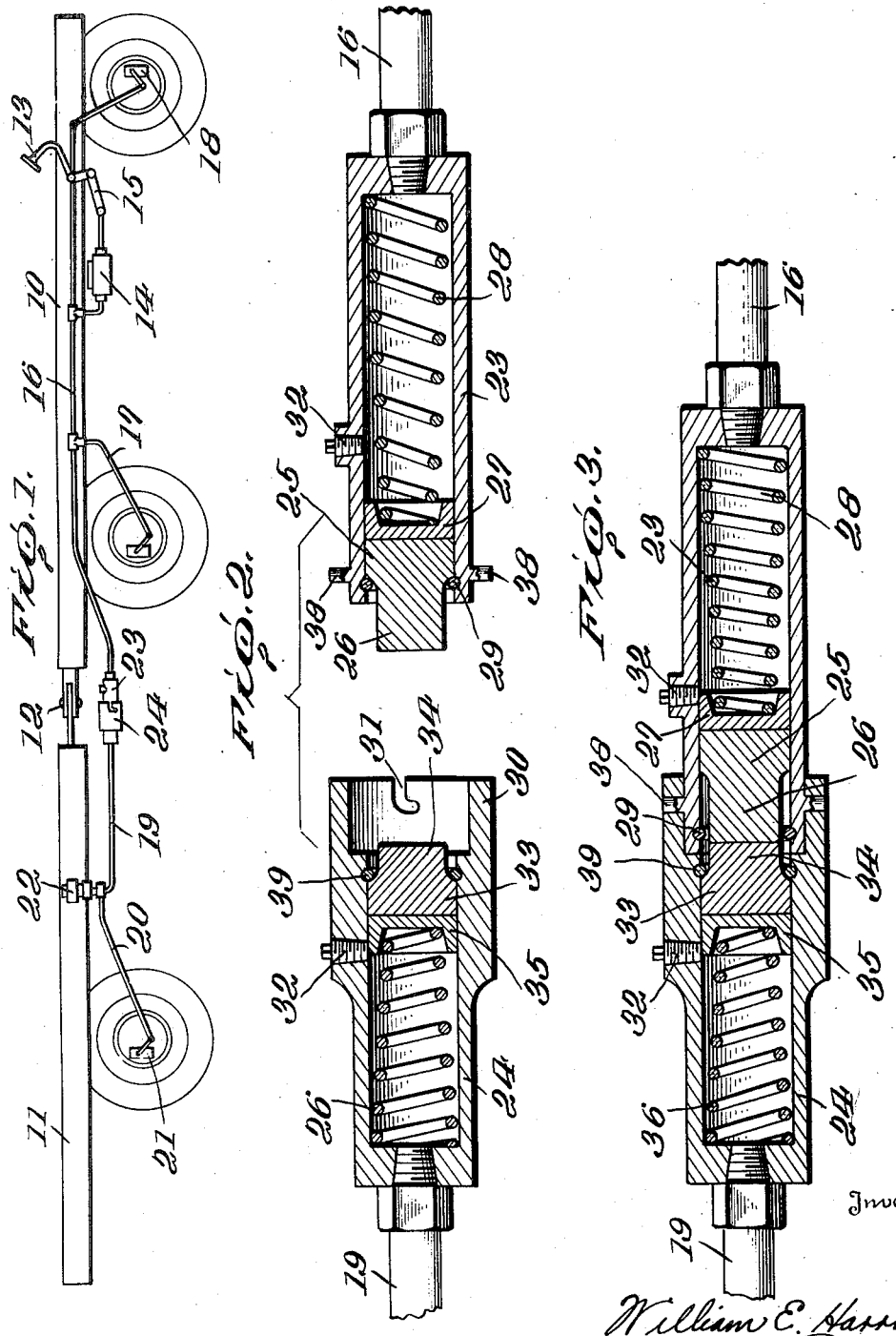
Inventor
William E. Harrington
By Mason & Porter
Attorneys Dec. 19, 1939.   W. E. HARRINGTON   2,184,042
HYDRAULIC BRAKE SYSTEM
Filed Aug. 14, 1937   2 Sheets-Sheet 2

Inventor
William E. Harrington
By Mason & Porter
Attorneys

Patented Dec. 19, 1939

2,184,042

UNITED STATES PATENT OFFICE 2,184,042

HYDRAULIC BRAKE SYSTEM

William E. Harrington, Beaumont, Tex.

Application August 14, 1937, Serial No. 159,159

7 Claims. (Cl. 188—3)

The present invention relates to new and useful improvements in hydraulic brake systems and more particularly to a hydraulic brake system with motor vehicles of the tractor and trailer type. In vehicles of this type it is customary to couple one or more trailers to a tractor or a motor-driven vehicle. An important consideration in the use of vehicles of this type, lies in the provision of an adequate and efficient braking mechanism by which the brakes on the trailer may be simultaneously applied with the brakes on the tractor. The present invention is directed to affording a hydraulic brake system of this type.

An object of the present invention is to provide a hydraulic braking apparatus for use with vehicles of the above type, wherein each vehicle is provided with a separate fluid braking system and wherein pressure is mechanically transmitted from one fluid system to another.

A further object of the invention is to provide a hydraulic braking apparatus of the above type wherein the fluid systems of adjacent vehicles remain isolated but are coupled together and wherein the coupling includes a pair of pistons, one on each of the adjacent vehicles, which are maintained in abutting relationship when connected, and which are urged outwardly when disconnected.

A further object of the invention is to provide a hydraulic braking apparatus of the above type, wherein spring means are provided for forcing the pistons outwardly when disconnected and wherein the pistons serve as a closing valve for preventing the escape of fluid from the respective fluid systems.

A further object of the invention is to provide a hydraulic braking apparatus of the above type, wherein reservoir means are provided on each vehicle for admitting additional fluid to the fluid system by the outward movement of the pistons.

The above and other objects of the invention will in part be obvious and will be hereinafter more fully pointed out.

In the drawings,

Figure 1 is a diagrammatic view of a tractor and trailer coupled together with my improved coupling between the fluid pressure systems on each vehicle.

Figure 2 is an enlarged detailed view, in section, showing the adjacent parts of the coupling when disconnected.

Figure 3 is a similar view, in section, showing the coupling parts, when connected.

Figure 4:
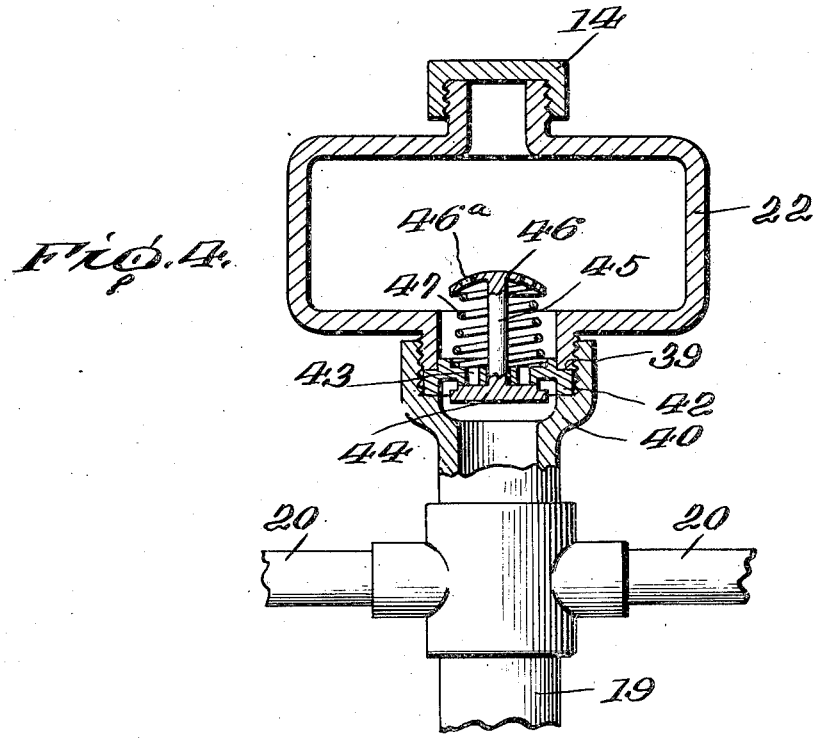
Figure 4 is an enlarged view, in section, showing one form of fluid supply reservoir on the trailer vehicle.

Referring more in detail to the accompanying drawings, and particularly to Figure 1, a tractor or motor-driven vehicle is illustrated at 10 and a trailer vehicle is indicated at 11. The tractor and trailer are connected by any suitable coupling means 12. The foot pedal 13 on the tractor 10 operates a master cylinder 14 through a lever and link mechanism 15. The master cylinder 14 is of conventional construction and is connected to the fluid pressure line 16 on the tractor. Branch conduits 17 lead from the fluid pressure line 16 to the brake cylinders 18. The brake shoes (not shown) may be operated in a conventional manner and springs connected thereto tend to retract the shoes from braking position.

The trailer 11 is provided with a fluid pressure line 19 from which branch conduits 20 lead to the brake cylinders 21 thereon. A fluid supply reservoir 22 is mounted on the trailer in communication with the fluid line 19 so as to maintain the supply of fluid therein in a manner to be hereinafter described. The fluid pressure lines 16 and 19 on the tractor and trailer, respectively, are connected by flexible hose means to cylinders 23 and 24, respectively.

Mounted within the cylinder 23 is a piston 25 which is provided with a reduced outer end portion 26. A flexible sealing cup 27 is mounted on the inner end of the piston 25 so as to maintain a liquid-tight seal, thus preventing leakage of the fluid in the line 16. A spring 28 is disposed between the flexible cup 27 and the opposite end of the cylinder 23 and serves to constantly urge the piston 25 outwardly. A stop ring 29 is disposed around the open end of the cylinder 23 and serves to limit outward movement of the piston 25 by abutting against the body portion thereof when it is urged outwardly by the spring 28. The cylinder 23 is provided with a bleeder port 32 so that any air accumulating in the cylinder may be vented.

The cylinder 24 is provided with an annular skirt portion 30 having bayonet slots therein. The cylinder 24 on the trailer is also provided with a piston 33 having a slightly shorter outer reduced end portion 34. A similar flexible sealing cup 35 is disposed against the inner end of the piston 33 and serves to prevent leakage of fluid from the line 19. A spring 36 is disposed between one end of the cylinder 24 and the sealing cup 35 and tends to urge the piston 23 outwardly. A stop ring 39 is located around the open end of the cylinder 24 which is within the annular skirt portion 30, and serves to limit the outward movement of the piston 33. The cylinder 24 is also provided with a bleeder port 32. The cylinder 23 is provided with outwardly extending lugs 38 which are adapted to extend into the bayonet slots 31 on the cylinder 24 when it is desired to connect the fluid pressure lines between adjacent vehicles.

Referring more in detail to Figure 4 of the accompanying drawings, the fluid supply reservoir 22 on the trailer 11 is connected to the supply line 19 and the branch conduits 20. The reservoir 22 is provided with a depending threaded annular portion 39 which threadedly engages a coupling pipe 40. The reservoir is provided with a removable cap 41 which may be removed to permit the addition of fluid. Communication between the supply reservoir 22 and the pipe 40 is controlled by a valve which includes a relatively hard rubber body portion 42 held between the depending portion 39 on the reservoir and an inner shoulder on the pipe 40. The body portion 42 forms a valve seat and is provided with apertures 43 therethrough. A valve member 44 is disposed on the under side of the valve seat and is provided with a stem 45 which extends upwardly therethrough and is provided with a head portion 46. The head portion 46 is provided with openings 46a to facilitate the passage of fluid. A relatively weak spring 47 is disposed between the head 46 and the upper face of the body portion 42. This spring 47 tends to normally hold the valve member 44 seated, thus closing the ports 43.

When the fluid pressure lines of adjacent vehicles are connected, that is, when the cylinders 23 and 24 are connected in the manner shown in Figure 3, the piston 33 will be urged outwardly by the spring 36 against the stop ring 39. Thus, the piston 25 will be held within the cylinder 23, as shown in Figure 3, when the brakes are released, because of the fact that the spring 36 is stronger than the spring 28. Thus, in operation, depression of the foot pedal 13 will operate on the master cylinder 14 to compress the fluid in the tractor line 16 to apply the brakes of the tractor vehicle. Simultaneously, however, the fluid in the tractor line 16 will force the piston 25 outwardly. The abutting relationship between the pistons 25 and 33 will result in a corresponding inward movement of the piston 33 on the trailer line, thus compressing the fluid in the trailer line 19 so as to apply the brakes on the trailer. During the application of the brakes on the trailer vehicle, compression of the fluid in the trailer line will additionally serve to maintain the valve 44 closed so as to prevent the passage of fluid from the line into the supply reservoir 22.

When the foot pedal 13 is released, pressure of the fluid in the tractor line 16 will be released so that the spring 36, being the strongest spring, will force the piston 33 outwardly and this in turn will force the piston 25 inwardly to the position shown in Figure 3. This outward movement of the piston 33, when the brakes are released, will create a slight suction pull on the trailer fluid line 19. This slight suction pull will tend to open the valve 44 against the action of the relatively weak spring 47 so that additional fluid may be drawn from the reservoir 22 into the trailer line when there is any shortage of fluid. When the tractor and trailer fluid lines are disconnected, that is, when the cylinders 23 and 24 are disconnected, the springs 28 and 36 will tend to force the pistons 25 and 33, respectively, outwardly to create a slight suction pull on their respective fluid lines so that additional fluid may be drawn from the supply reservoir if there is any shortage. The fluid lines on the respective vehicles are thus maintained completely filled by the automatic action of the coupling between the vehicles.

Figure 5:
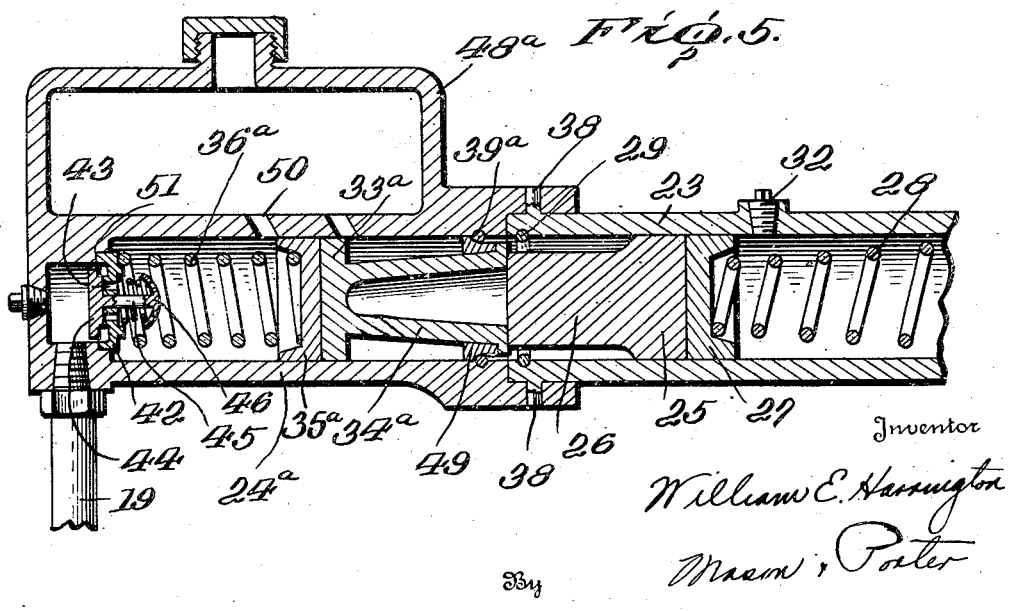
Figure 5 is a detailed view, in section, showing the adjacent coupling parts connected and showing a modified form of fluid supply reservoir formed as a part of the trailer coupling.

Referring to Figure 5 of the accompanying drawings, there is shown a slightly modified form of construction. In this case, the coupling for the fluid line on the tractor is substantially the same as that heretofore shown and described. The cylinder 24a on the trailer line is modified so that it includes a reservoir 48a formed integral therewith. This form of construction is somewhat similar to the customary master cylinder and includes a piston 33a against the inner end of which is mounted a flexible sealing cup 35a. The reduced portion of the piston 33a is made in the form of a web construction 34a which abuts against the reduced end 26 of the piston 25 on the tractor. A shoulder 49 is provided on the piston 34a which abuts against the stop ring 39a in order to limit the outward movement thereof. A strong spring 36a is disposed between the flexible sealing cup 35a and the body portion of the valve at the opposite end of the cylinder 24a. This valve is of the same construction as that shown and described in connection with Figure 4. Communication is provided between the reservoir 48a and the cylinder 24a by means of a port 50.

When the brakes on the tractor are applied, the piston 25 will be urged outwardly and the reduced end 26 thereof will force the piston 33a inwardly against the action of the spring 36a. This inward movement of the piston 33a will close the port 50 and will force fluid through the ports 43 in the body portion 42 of the valve and will thus force the valve member 44 off of its seat so that the fluid will be transmitted into the trailer line 19 to apply the trailer brakes. When the brakes on the tractor are released, the spring 36a will force the piston 33a outwardly to the position shown in Figure 3 so that the port 50 affords communication between the reservoir 48 and the cylinder 24a. The springs (not shown) which operate to separate the brake shoes on the trailer vehicle, are of a strength sufficient to force the fluid out of the brake cylinders 21 and to cause the fluid under pressure in the line 19 to shift the entire valve body portion 42 away from its support 51 on the cylinder 24a. Thus, the fluid forced from the brake cylinders will be permitted to pass between valve body 42 and into the cylinder 24a. The communication between the reservoir 48 and cylinder 24a assures that the fluid line on the trailer will be maintained completely filled with the necessary amount of fluid.

It will be seen from the foregoing description that a highly efficient and relatively simple braking system for tractor and trailer vehicles is herewith provided. The fluid pressure lines on the tractor and trailer vehicles are maintained completely filled with the necessary amount of fluid by the automatic operation of the coupling between the tractor and trailer vehicles.

It is to be clearly understood that minor changes in detail of construction and arrangement of parts may be made without departing from the scope of the invention as set forth in the appended claims.

I claim:

1. In a braking apparatus for tractor and trailer vehicles having separate fluid pressure operated brake systems, a pair of cylinders, one connected to the tractor system and the other connected to the trailer system, means for detachably connecting said cylinders, a pair of pistons, one mounted in each of said cylinders and serving to prevent leakage of fluid from the systems, a relatively weak spring disposed in the cylinder on the tractor for normally forcing the piston outwardly, and a relatively strong spring disposed in the cylinder on the trailer for normally forcing the piston outwardly whereby to maintain the pistons in abutting relationship when the cylinders are connected, said relatively strong spring operating to maintain the piston on the trailer outwardly and the piston on the tractor inwardly when the brakes are released.

2. In a braking apparatus for tractor and trailer vehicles having separate fluid pressure operated brake systems, a pair of cylinders, one connected to the tractor system and the other connected to the trailer system, means for detachably connecting said cylinders, a pair of pistons, one mounted in each of said cylinders and serving to prevent leakage of fluid from the systems, a relatively weak spring disposed in the cylinder on the tractor for normally forcing the piston outwardly, a relatively strong spring disposed in the cylinder on the trailer for normally forcing the piston outwardly whereby to maintain the pistons in abutting relationship when the cylinders are connected, said relatively strong spring operating to maintain the piston on the trailer outwardly and the piston on the tractor inwardly when the brakes are released, a supply reservoir connected to the trailer system, a valve for controlling communication between said reservoir and the trailer system, and a relatively weak valve spring normally closing said valve and operable upon outward movement of the piston on the trailer under the action of said relatively strong spring to admit fluid from the reservoir to the trailer system when any shortage of fluid occurs therein.

3. In a braking apparatus for tractor and trailer vehicles having separate fluid pressure operated brake systems, a pair of cylinders, one connected to the tractor system and the other connected to the trailer system, means for detachably connecting said cylinders, a pair of pistons, one mounted in each of said cylinders and serving to prevent leakage of fluid from the respective systems, and a pair of springs disposed one in each of said cylinders for normally forcing said pistons outwardly when the cylinders are disconnected and for maintaining said pistons in abutting relationship when the cylinders are connected, said springs being differentially tensioned so that the piston on the trailer is forced outwardly and the piston on the tractor is forced inwardly when the cylinders are connected and the brakes released.

4. In a braking apparatus for tractor and trailer vehicles having separate fluid pressure operated brake systems, a coupling for the tractor and trailer systems including a pair of detachably connected cylinders, one of said cylinders being connected to the tractor system and the other of said cylinders being connected to the trailer system, a pair of pistons, one mounted in each of said cylinders and serving to prevent leakage of fluid from the respective systems, a fluid supply reservoir connected to the trailer system, valve means for normally closing communication between the trailer system and said reservoir when the brakes are released and the pistons are in a released position, and spring means for forcing said pistons toward the tractor when the brakes are initially released, said spring means operating to create a suction pull in the trailer system for opening said valve means to admit additional fluid from said reservoir when there is a shortage in the trailer system.

5. In a braking apparatus for tractor and trailer vehicles having separate fluid pressure operated braking systems, a coupling for the tractor and trailer systems including a pair of detachably connected cylinders, one of said cylinders being connected to the tractor system and the other of said cylinders being connected to the trailer system, a pair of pistons, one mounted in each of said cylinders and serving to prevent leakage of fluid from the respective systems, a fluid supply reservoir connected to the trailer system, valve means for normally closing communication between the trailer system and said reservoir when the brakes are released and the pistons are in a released position, and spring means associated with said coupling for forcing said pistons toward the tractor when the brakes are initially released, said spring means operating to create a suction pull in the trailer system for opening said valve to admit additional fluid from said reservoir when there is a shortage in the trailer system.

6. In a braking apparatus for tractor and trailer vehicles having separate fluid pressure operated brake systems, a coupling for the tractor and trailer systems including a pair of detachably connected cylinders, one of said cylinders being connected to the tractor system and the other of said cylinders being connected to the trailer system, a pair of pistons, one mounted in each of said cylinders and serving to prevent leakage of fluid from the respective systems, each of said vehicle systems having reservoir means for containing additional brake fluid, valve means for normally closing communication between said systems and said reservoir means when the brakes are released and the pistons are in a released position, and spring means disposed in each of said cylinders and operating to force said pistons outwardly while disconnecting said cylinders whereby to create a suction pull in each of the systems to draw additional fluid therein when needed, said spring means maintaining said pistons in abutting relationship when the cylinders are being connected and being relatively tensioned to force both of said pistons toward the tractor vehicle when the brakes are released whereby to maintain a sufficient amount of fluid in the system for efficient braking action.

7. In a braking apparatus for tractor and trailer vehicles having separate fluid pressure operated braking systems, a coupling for the tractor and trailer systems including a pair of detachably connected cylinders, one of said cylinders being connected to the tractor system and the other of said cylinders being connected to the trailer system, a pair of pistons, one mounted in each of said cylinders and serving to prevent leakage of fluid from the respective systems, a fluid supply reservoir connected to the trailer system, valve means including a relatively weak spring effective for normally closing communication between the trailer system and said reservoir when the brakes are released and the pistons are in a released position, and relatively strong spring means associated with said coupling for forcing said pistons toward the tractor when the brakes are initially released, said relatively strong spring means operating to create a suction pull in the trailer system for opening said valve against the action of said relatively weak spring to admit additional fluid from said reservoir when there is a shortage in the trailer system.

WILLIAM E. HARRINGTON.